April 27, 1965 R. L. HAND, JR., ETAL 3,180,989
CRYOGENIC FLASK FOR A COOLED INFRARED DETECTOR INCLUDING
AN EVACUATED SPACE FOR THE INFRARED DETECTOR
Filed Jan. 11, 1962 4 Sheets-Sheet 1

FIG_1

INVENTORS
ROSS L. HAND, JR.
RUSSEL C. SESSING

By
Agent

INVENTORS
ROSS L. HAND, JR.
RUSSEL C. SESSING
By George Sullivan
Agent

April 27, 1965 R. L. HAND, JR., ET AL 3,180,989
CRYOGENIC FLASK FOR A COOLED INFRARED DETECTOR INCLUDING
AN EVACUATED SPACE FOR THE INFRARED DETECTOR
Filed Jan. 11, 1962 4 Sheets-Sheet 3

INVENTORS
ROSS L. HAND, JR.
RUSSEL C. SESSING

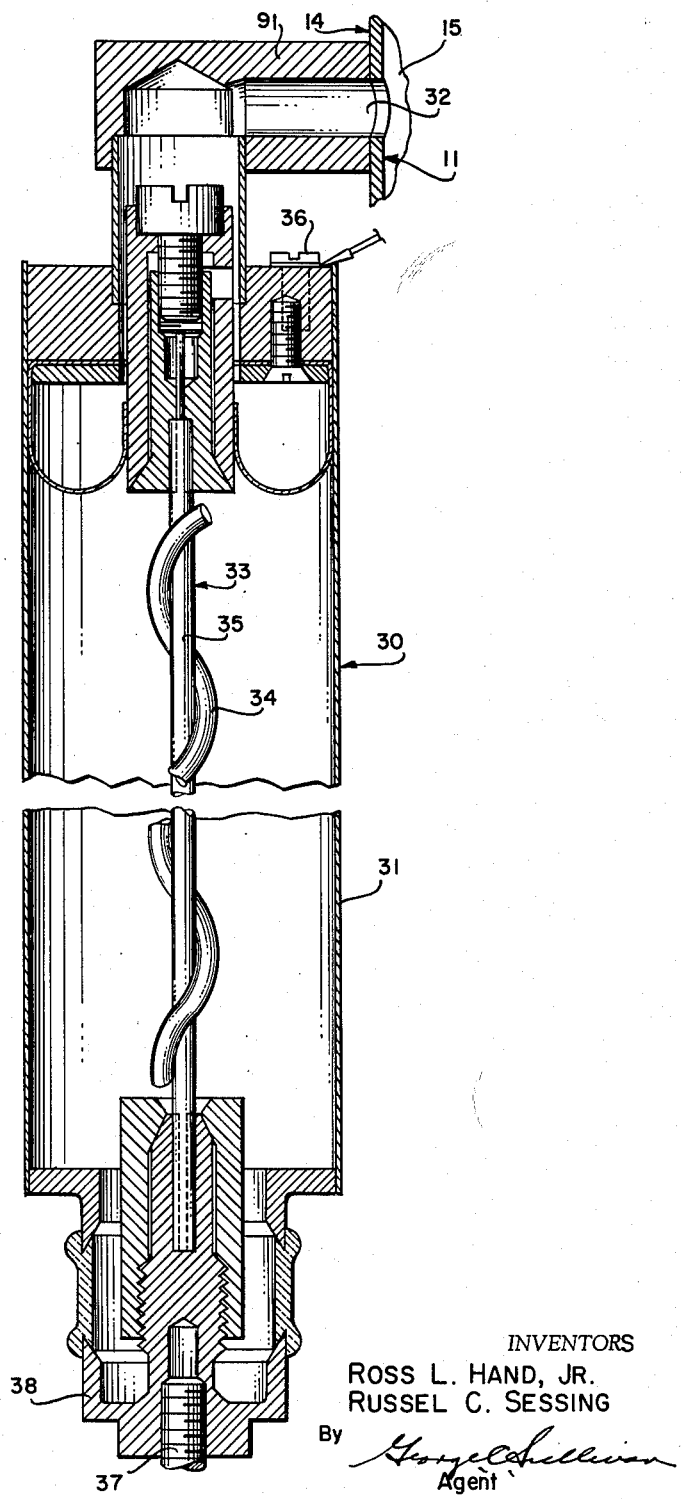

United States Patent Office 3,180,989
Patented Apr. 27, 1965

3,180,989
CRYOGENIC FLASK FOR A COOLED INFRARED DETECTOR INCLUDING AN EVACUATED SPACE FOR THE INFRARED DETECTOR
Ross Lowell Hand, Jr., Sun Valley, and Russel C. Sessing, Montrose, Calif., assignors to Lockheed Aircraft Corporation, Burbank, Calif.
Filed Jan. 11, 1962, Ser. No. 165,589
13 Claims. (Cl. 250—83.3)

This invention relates to a cryogenic flask for cooled infrared detectors and more particularly to a means for housing an infrared detector so that it can be cooled to a very low temperature by a liquefied gas wherein the entire housing is fabricated from a material minimizing contraction and/or distortion yet which exposes the infrared detector for the transmission of infrared energy in a predetermined wave length region detectable by the detector. The instant invention is adaptable for use with either single or multi-cell infrared detectors.

More specifically, this invention provides a new and improved Dewar type vessel fabricated from a material having minimum contraction and/or distortion when cooled with a liquefied gas which comprises an inner and outer container between which the space is evacuated, the inner container being adapted to contain a cryogenic fluid for cooling an infrared detector secured to the inner container in the space and adapted to be connected to an electrical circuit extending exteriorly of the outer container. The vacuum space between the containers provides insulation for the coolant of the inner container for insuring cooling of the infrared responsive means for an extended period of time. This vacuum insulation also keeps the outer container at essentially ambient temperature for preventing moisture condensation on an infrared energy transmitting window mounted in the one wall of the outer container and adjacent to the infrared detector for transmitting infrared energy in a predetermined wave length region detectable by the infrared detector.

The infrared detector is mounted on an anvil provided on the bottom of the inner container with an adhesive providing maximum conductive heat transfer from the detector to the inner container.

Since there is a certain amount of out-gassing occurring continuously in the vacuum space, a getter means is, in accordance with this invention provided to communicate with the space between the containers and adapted to be connected to an electrical circuit for energization thereof, the getter means including material having an affinity for any trace gases in the space for condensing these trace gases so as to decrease atmospheric pressure in the space and prevent deterioration of the vacuum in the space over a predetermined period of time.

Previous attempts to cool multi-cell infrared detectors have been largely attempted through the use of glass Dewar housings. These, however, have had a serious disadvantage in being subject to mechanical breakage, thermal shock breakage, leak loss of vacuum, poor vacuum resulting in short duration operation, and water vapor condensation on an infrared transmission window thereof and have therefore been, for the most part, relatively unsuccessful.

It is therefore an object of this invention to provide a new and improved cryogenic flask for housing a single or multi-cell infrared detector so as to achieve very low temperature cryogenic cooling of the detector for relatively long periods of time.

Another object of this invention is to provide a new and improved cryogenic flask for cooling of infrared detectors to increase detector sensitivity to the longer wave length regions of the infrared portion of the spectrum.

Still another object of this invention is to provide a new and improved cryogenic housing for cooled infrared detectors which is more advantageously constructed with all its parts, with the exception of a window means, composed of a metallic material for minimizing contraction and distortion when cooled with the cryogenic fluid, is much more sturdy than its glass counterpart and is less susceptible to breakage.

A further object of this invention is to provide a new and improved cryogenic flask of the character described in which the construction allows for repair thereof during and after fabrication.

Yet another object of this invention is to provide a new and improved cryogenic housing which insures a minimum of thermal contraction occurring when a coolant is used and therefore facilitates retaining of the detector in its proper relative position.

A further feature of this invention is the provision of getter pump means communicating with the space between the containers for periodically renewing the vacuum therebetween for insuring a good insulating vacuum between the containers.

Another important object of this invention is to provide a new and improved cryogenic flask of the character described which is more readily adaptable for use with a multi-cell array of infrared detectors, but which can be used with a single detector.

Another object of this invention is to provide a new and improved getter means in which the getter housing may be opened and getting material therein removed or replaced when necessary.

A further object of this invention is to provide a new and improved cryogenic flask having a vacuum measuring device incorporated therein by which periodic checks can be easily and readily accomplished.

Still another object of this invention is to provide a new and improved cryogenic flask for cooled single or multi-cell infrared detector in which electric leads secured to the cell are supported in spaced relationship to the containers and extended exteriorly of the outer of the containers in non-electrical conductive relationship thereto for connection to an electrical circuit exteriorly of the outer of the containers and mounted so as to reduce microphonics.

A general object of this invention is to provide a new and improved cryogenic flask for cooled infrared detectors of the character described which overcomes disadvantages of prior means and methods heretofore intended to accomplish generally similar purposes.

These and other objects of this invention will be more apparent from the following detailed description, drawings and appended claims.

In the drawings:

FIGURE 5 is a vertical, cross-sectional view, as taken substantially along the longitudinal centerline of the getter means of this invention.

Figure 1:
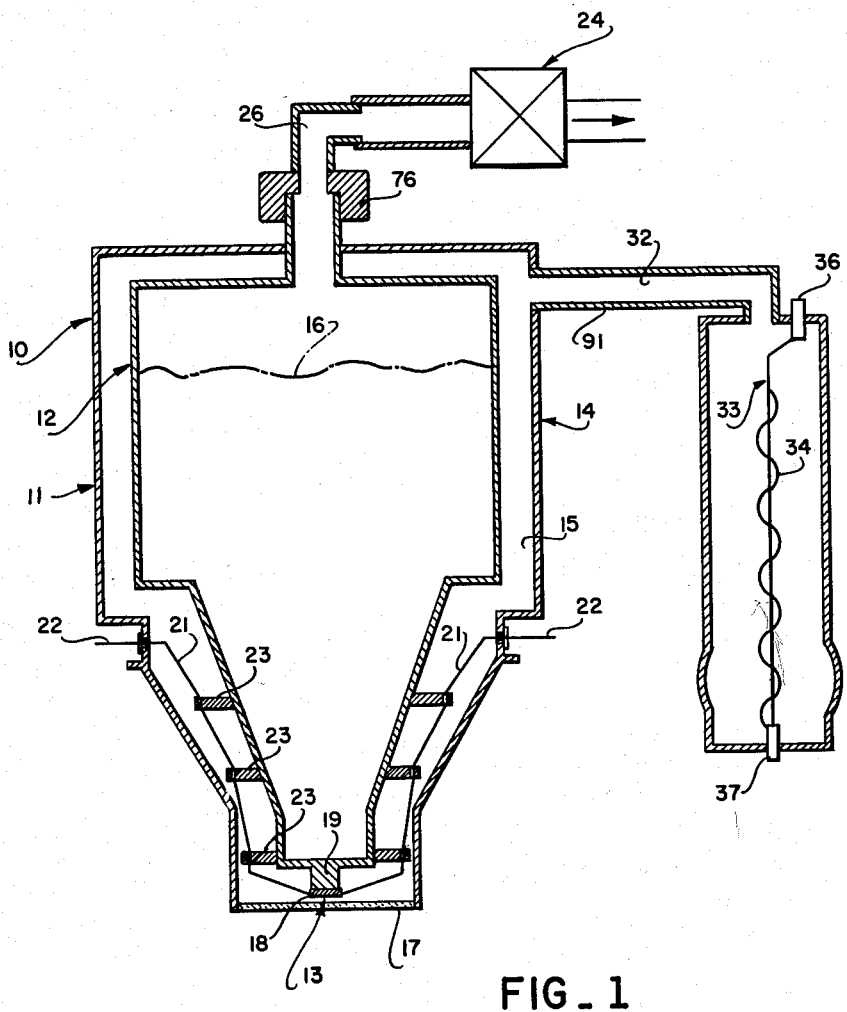
FIGURE 1 is a diagrammatic view of the cryogenic flask of this invention.

Referring in detail to the drawings, there is shown, by way of illustration, but not of limitation, a new and improved cryogenic flask designed and constructed in accordance with this invention for the purpose of housing a multi-cell infrared detector and generally designated by the numeral 10. The apparatus 10 generally comprises a double-walled Dewar type flask 11 defining an inner container 12 adapted to contain the cryogenic fluid, such as liquefied nitrogen, helium, or other gas, for cooling an infrared detector 13 to a very low temperature and an outer container 14 surrounding the inner container 12 and spaced apart therefrom, the space 15 between the containers being evacuated so as to provide a high vacuum therebetween.

Both containers 12 and 14 are fabricated from a metallic material, such as Invar, or the like, to provide a minimal contraction and distortion when cooled with the liquefied gas 16. The vacuum space 15 between the containers 12 and 14 provides insulation for the coolant 16 in the inner container 12 for insuring cooling of the detector 13 for an extended period of time. This vacuum insulation also keeps the outer container 14 at essentially ambient temperatures preventing moisture condensation on an infrared window 17 provided in the wall of the outer container 14 adjacent to the detector 13, the window 17 being of a material suitable for the transmission of infrared energy in a predetermined wave length region detectable by the detector 13, such as sapphire, or the like.

The detector 13, as herein illustrated, comprises a multicell infrared responsive means having, for example, thirty photoelectric transducer cells, which are secured to the exterior surface 18 of an anvil 19 formed integrally with the inner container 12 and depending into the space 15 adjacent to the window 17, in in spaced relationship thereto so that infrared energy may be transmitted in a predetermined wave length region for detection by the detector 13. The window 17 is sealed by suitable adhesive means, such as an epoxy resin, or the like, in the outer container 14 to preserve the vacuum between the containers.

The cells of the detector 13 are provided with individual circuits 21 supported in spaced, insulated relationship to each other in the space 15 and having leads 22 extending exteriorly of the outer container 14 and adapted to be connected to an electrical circuit (not shown) extending exteriorly of the outer container 14. The leads of the circuits 21 are mounted as on stand-offs 23 secured to the inner containers which are advantageously cooled by conduction from the coolant of the inner container 12. Boil-off from the coolant fluid 16 of the inner container is controlled by a pressure relief valve, schematically shown in FIGURE 1 and indicated by the numeral 24, which is located in an inlet passageway 26 communicating between the interior of the inner container 12 and the exterior of the apparatus.

In accordance with this invention, the inner container of metallic material is cooled by a coolant fluid 16, such as liquefied nitrogen, helium, or the like, so as to cool the anvil 19 and the detector 13 secured thereto. The detector 13 is preferably secured to the outer surface of the anvil 19 by an adhesive having high heat conduction properties so as to provide a maximum conductive heat transfer from the infrared detector to the coolant fluid 16.

Inasmuch as there is a certain amount of out-gassing occurring continuously in the vacuum space 15, a getter means, generally referred to by the numeral 30 (FIGURE 5), is provided for preventing deterioration of the vacuum over an extended period of time and to regenerate the vacuum periodically. The getter means 30 comprises an enclosed envelope 31 formed of stainless steel, or the like, and connected to the vacuum 15 by a passageway 32 communicating between the vacuum space 15 and the interior of the envelope 31. The getter further includes a heater means 33 and quantity of getting material 34 juxtaposed thereto, the heater means being adapted to be electrically operated as by connection of a suitable circuit (not shown) to terminals 36 and 37 extending outwardly and through the wall of the envelope 31. The heater means 33 preferably comprises a tungsten wire 35 connected across the terminals 36 and 37 whereas the getting material preferably comprises a material having an affinity for any trace gases occupying the space 15 and preferably comprises a titanium wire wrapped around the tungsten wire so that when a current is applied to the heater means 33 the titanium wire vaporizes a predetermined amount which attracts trace gases in the vacuum space and deposits the trace gases on the walls of the flask 11. Such pumping of a getting means works only when the vacuum is good to begin with; therefore, initially, the flask 11 is evacuated by a conventional oil diffusion pump, or the like, to obtain a high vacuum. The titanium wire 34 is gradually used up with continuous heatings in which event the cartridge 30 may be opened by removing a cap 38 and associated parts thereof after which a new wire 34 may be installed when necessary.

Figure 2:
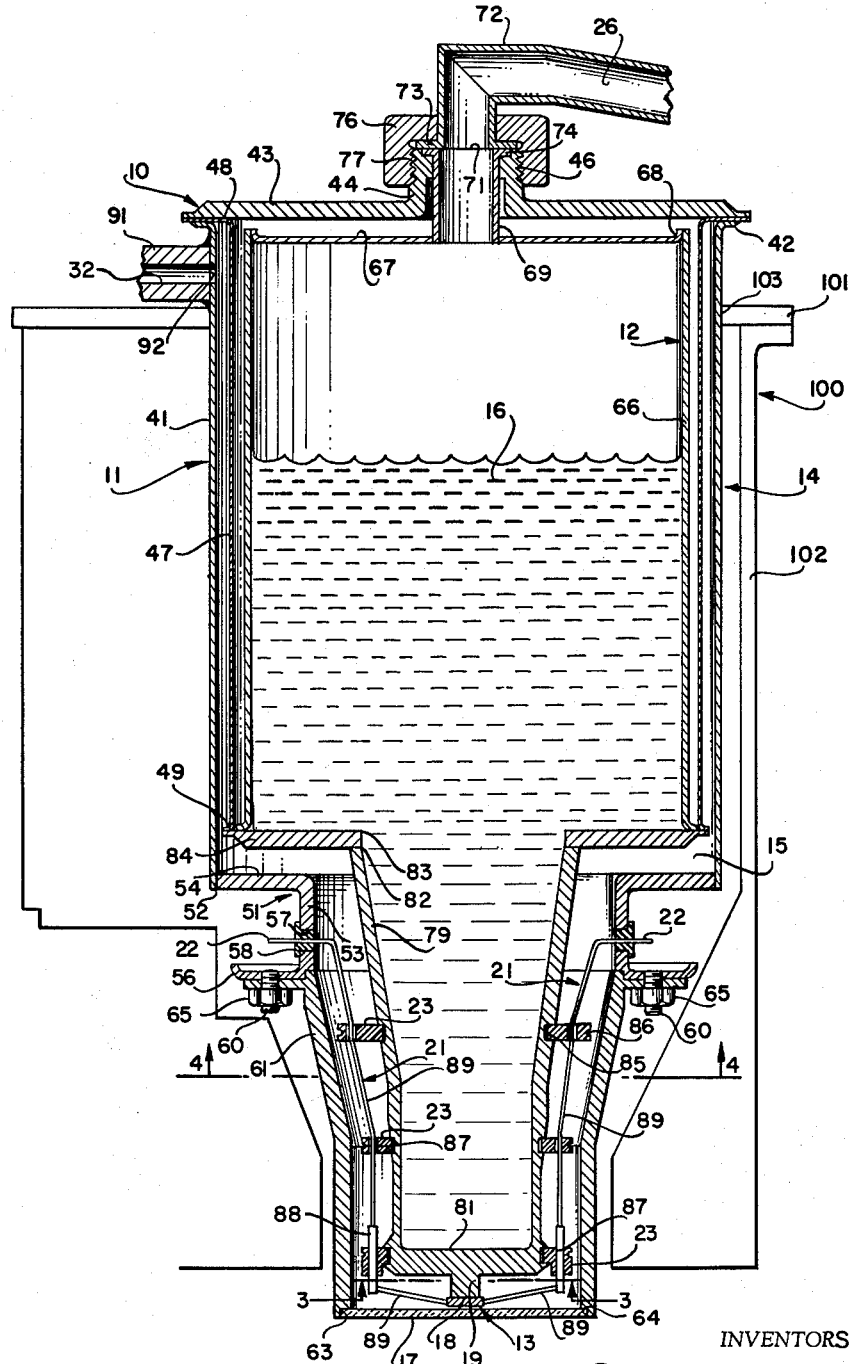
FIGURE 2 is an enlarged, vertical, cross-sectional view, as taken substantially along the longitudinal centerline of the flask, showing the flask in greater detail.
Figure 3:
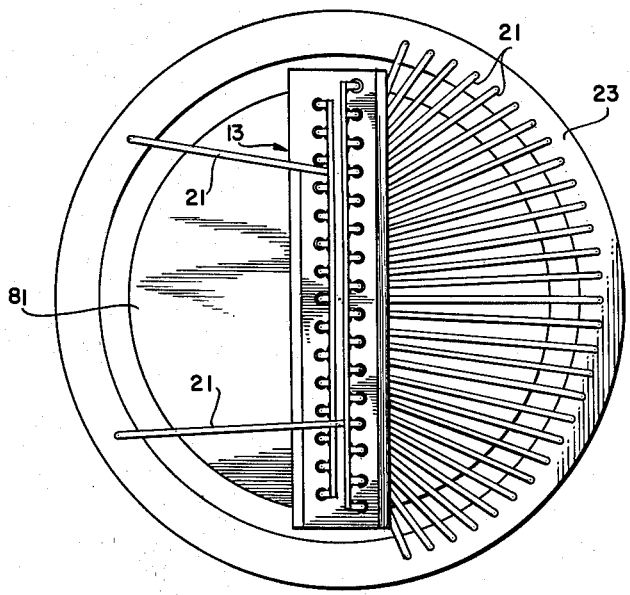
FIGURE 3 is a horizontal, cross-sectional view, as taken substantially along the line 3—3 of FIGURE 2.
Figure 4:
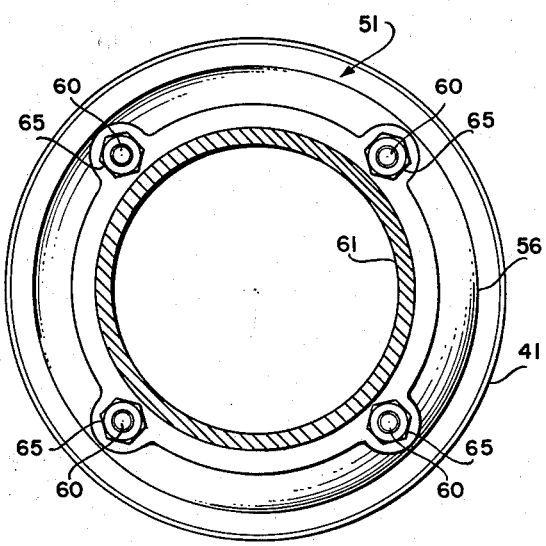
FIGURE 4 is a horizontal, cross-sectional view, as taken substantially along line 4—4 of FIGURE 2 and illustrating only the outer structure.

As best seen in FIGURES 2–4, inclusive, wherein the flask 11 is shown in greater detail, the inner and outer containers 12 and 14, respectively, are conveniently and advantageously formed of a plurality of discrete parts secured together and the inner container 12 is supported within the outer container 14 so as to be removable therefrom whereby the containers may be repaired and/or replaced during or after fabrication thereof. The outer container includes a relatively enlarged upper tubular portion 41 having an upper annular flange 42 to which a head plate 43 is secured, by brazing, welding, soldering, or the like, the head plate 43 including a centrally located tubular boss 44 which is externally threaded as indicated by the numeral 46. A supporting bracket 47 has an outwardly extending flange portion 48 secured integrally with the heat plate and flange 42 and a lower end 49 secured to the inner container 12 for supporting the inner container 12 in spaced relationship to the outer container 14. An annular skirt 51 is secured to the bottom of the tubular portion 41, around its periphery as indicated by the numeral 52 as by brazing, welding, soldering, or the like, so as to depend therefrom. The skirt portion 51 comprises a tubular portion 53, an upper annular flange 54 and a lower annular flange 56. The element 41 is secured to the periphery of the annular flange 54 and a lower annular flange 56. The element 41 is secured to the periphery of the annular flange 54 whereas the tubular portion 53 is provided with a plurality of radial apertures 57 having outlet insulators 38 mounted therein through which the leads 22 extend so as to extend from the space 15 to the exterior of the outer container 14 in sealed relationship thereto. A frusto-conical window mount 61 has an upper annular flange attached to the flange 56 of the skirt portion 51 and a lower open end 63. The window 17, formed of a relatively thin disc of sapphire, or other equivalent material, capable of transmitting infrared energy in a predetermined wave length region detectable by the infrared detector 13 is secured within the open end 63 of the mount member 61 by a suitable adhesive means indicated by the numeral 64. Optionally, the window 17 may be metallized and soldered to the holder member 61 to close the open end 63 and in a position adjacent to the infrared detector 13.

The inner container 12 comprises an enlarged tubular portion 66 having its upper open end closed in sealed relationship by a diaphragm 67 as by welding, soldering or brazing of a flange 68 complementary to the upper opening. A tube 69 is provided substantially centrally located in the diaphragm 67, the tube having an outer open end 71 retained in communication with a relief tube 72 forming the passageway 26 to permit boil-off of the fluid 16 contained within the inner container 12 as previously described. The tube section 72 preferably has an annularly flanged end 73 positioned adjacent to the open end of the inlet tube 69. The flange 73 and a similar flange 74 of the inlet tube 69 are clamped to the upper end of the tubular extension 44 of the outer container plate 43 by a cap 76, the cap 76 having an internal thread 77 co-operable with the external threads 46 of the extension 44 for securing the flanges 73 and 74 together and to the extension 44. The pressure relief valve 24 is secured to the outer end of the relief tube 72 by conventional means.

The inner container 12 further includes a lower neck portion 79 having a closed bottom 81 on which the anvil 19 is integrally formed and an open end 82 secured so as to be aligned with an opening 83 of an annular plate 84 secured to the bottom periphery of the tubular enlarged portion 66 as by brazing, welding, or the like. The bottom of the bracket means 47 is also secured to the bottom periphery of the plate 84 and the tubular member 66 to support the inner container 12 in spaced relationship to the outer container 14.

The stand-off means 23 comprises a plurality of annular members of an insulating material, such as plastics, or the like, each ring having a peripheral groove 86 and a plurality of radially and circumferentially spaced axial apertures 87 through which the circuits 21 extend for support thereof. The rings 23 are seated in axially spaced annular grooves 85 formed in the wall of the neck portion 79.

The circuits 21 are preferably reinforced by copper wire terminals 88 of relatively larger diameter extending through the apertures 87 of the lowermost annular member 23. Relatively fine copper wires 89 connect the terminals 88 with their respective cells of the detector 13 and the lead 22. In this manner, the individual leads 21 connect individual cells with a suitable circuit exteriorly of the outer container 14 through the leads 22 extending through the annular wall 53 of the skirt portion 51 so as to be sealed relative to the container and electrically insulated by the insulators 58 disposed within the radial apertures 57 of the skirt.

The interior of the getter means 30 communicates with the space 15 between the containers 12 and 14 by means of a tubular element 91 forming the passageway 32, the tubular member 91 being welded, brazed, or otherwise secured to an opening 92 of the outer container section 41 whereby trace gases from the space 15 are attracting by the getting means for assuring a maximum vacuum between the containers.

The apparatus 10 may be readily supported by a support means 100 having a head plate 101 supported on a vertical wall 102 and having an opening 103 through which the outer housing section 14 extends.

While there is herein shown and described what is conceived to be the most practical and preferred embodiment of this invention, it is recognized that departures may be made therefrom within the scope of this invention which is not to be limited to the details disclosed herein but is to be accorded the full scope of the claims so as to embrace any and all equivalent devices.

What is claimed as new and desired to secure by Letters Patent is:

1. A cryogenic flask for cooled infrared detectors, comprising: a double walled vessel defining an inner container spaced apart from an outer container, the space therebetween being evacuated, said inner container being adapted to contain a cryogenic fluid in direct contact and heat exchange relation therewith; infrared responsive means secured to said inner container and in said space so as to be cooled by said inner container and adapted to be connected to an electrical circuit extending exteriorly of said outer container; said outer container including a wall adjacent to said infrared responsive means; and window means forming at least a portion of said wall and being secured in sealed relationship to said outer container, said window means being of a material transmitting infrared energy in a predetermined wave length region detectable by said infrared responsive means.

2. A cryogenic flask as defined in claim 1, wherein said infrared responsive means is secured to said inner container by a heat conductive adhesive material so as to cool said infrared responsive means by conduction when said inner container contains said cryogenic fluid.

3. A cryogenic flask as defined in claim 1, including means defining a passageway communicating between said inner container and the exterior of said outer container; and pressure relief means in said passageway for relieving the pressure in said inner container containing the cryogenic fluid at a predetermined pressure.

4. A cryogenic flask as defined in claim 1, wherein said double walled vessel comprises a metallic material and said inner container includes anvil means integral therewith and having an outer, relatively flat surface adjacent to said window means, said infrared responsive means being secured to said outer surface of said anvil means so as to be juxtaposed to said window means in predetermined spaced relationship thereto.

5. A cryogenic flask as defined in claim 1, including getter means communicating with said space and adapted to be connected to an electrical circuit for energization thereof, said getter means having an affinity for any trace gases so as to decrease atmospheric pressure in said space, wherein said getter means includes an envelope having a passageway connected thereto and communicating between the interior of said envelope and said space between said inner and outer containers; heater means adapted to be electrically operated externally of said envelope; and a wire of getter material juxtaposed to said heater means.

6. An apparatus as defined in claim 5, wherein said heater means is a tungsten wire and said getter material is a titanium wire.

7. An apparatus as defined in claim 4, wherein said infrared responsive means includes a plurality of laterally spaced photoelectric transducers arranged coplanarly and linearly on said anvil means and said circuit means are each supported in said space and in insulated relationship to said inner container.

8. A cryogenic flask for cooled infrared detectors, comprising: a double walled vessel defining an inner container adapted to contain a cryogenic fluid and an outer container surrounding said inner container, both containers being comprised of a metallic material; means supporting said inner container in spaced relationship to said outer container, the space therebetween being evacuated; said inner container including an enlarged upper portion having a relief passageway extending through its top and communicating with the interior of said inner container and a reduced neck portion at its lower portion terminating in an anvil integral therewith and depending into said space; infrared responsive means secured in said space and to the exterior of said anvil means; electrical circuit means supported in spaced electrical relationship to said reduced neck of said inner container; said outer container including an enlarged upper portion surrounding said upper portion of said inner container and an annular skirt portion depending therefrom and around said neck portion of said inner container and a cup-shaped lower portion detachably secured to said skirt portion, the bottom wall of said cup-shaped portion comprising a window of a material transmitting infrared energy in a predetermined wave length region detectable by said infrared responsive means; and electrical lead means extending through said skirt portion in insulated relationship thereto and adapted to connect said circuits of said infrared responsive means to an electrical circuit externally of said outer container.

9. An apparatus as defined in claim 8, wherein said cup-shaped lower portion of said outer container is detachably secured to said skirt portion.

10. An apparatus as defined in claim 8, wherein said means mounting said circuits in said space includes a plurality of axially spaced mounting rings of electrical insulating material secured to said neck portion of said inner container and having a plurality of radially and circumferentially spaced apertures, said circuits of said infrared responsive means being supported in said apertures of said mounting rings.

11. An apparatus as defined in claim 8, including getter means communicating with said space and adapted to be connected to an electrical circuit for energization thereof, said getter means having an affinity for any trace gases in said space for condensing said trace gases so as to decrease atmospheric pressure in said space.

12. An apparatus as defined in claim 8, wherein said infrared responsive means is secured to said inner container by a heat conductive adhesive material so as to cool said infrared responsive means by conduction when said inner container contains the cryogenic fluid.

13. An apparatus as defined in claim 8, including means defining a passageway communicating between said inner container and the exterior of said inner container; and pressure relief valve means in said passageway for relieving the pressure within said inner container containing the cryogenic fluid.

References Cited by the Examiner
UNITED STATES PATENTS

| | | | |
|---|---|---|---|
| 2,988,265 | 6/61 | Reich | 313—7 |
| 3,025,680 | 3/62 | De Brosse | 250—83.3 |
| 3,066,222 | 11/62 | Poorman | 250—83.3 |

RALPH G. NILSON, *Primary Examiner.*